April 30, 1957  S. J. CROCKETT  2,790,338
POWER TRANSMISSION
Filed July 10, 1952  5 Sheets-Sheet 3

INVENTOR
Samuel J. Crockett
BY
Dowell & Dowell
ATTORNEYS

United States Patent Office 2,790,338
Patented Apr. 30, 1957

2,790,338
POWER TRANSMISSION
Samuel James Crockett, Philippi, W. Va.

Application July 10, 1952, Serial No. 298,054

10 Claims. (Cl. 74—687)

This invention relates to power transmissions and particularly to a transmission having a variable ratio between the input torque shaft and the output torque shaft without loss due to slippage between the prime mover and the output torque shaft as is usually encountered with torque converters at low speeds. Fluid type torque converters have no mechanical connection between the driving shaft and the driven shaft except a body of oil. However, my present invention is connected directly all the way from the source of power through the output shaft by means of gearing. The amount of rotation of the output shaft in proportion to the rotation of the input shaft is variable all the way from zero or neutral position to high or the top range of the gearing built into the device, the amount of variation being controlled by the operator.

One object of this invention is to provide a transmission having an adjustable range which will at the same time eliminate a greater portion of the slippage now encountered by conventional converters.

Another object of this invention is to provide a transmission for heavy-duty vehicles such as trucks, tractors, or the like which normally use two-speed differentials so they can change gear ratios while moving without shifting gears or using clutches.

A still further object of this invention is to completely eliminate the use of a two-speed differential unit in trucks because the speed reduction can be had in the transmission from zero to top range and there will be no necessity of building expensive differential units, and the transmission will give a greater reduction than can be obtained by the two-speed differential unit and the reduction or increase can be varied at will.

I will explain the invention with reference to the accompanying drawings which illustrate one practical embodiment thereof to enable others familiar with the art to adopt and use the same, and will summarize in the claims the novel features of construction and novel combinations of parts for which protection is desired.

In order to provide controlled variation between the input torque shaft and the output torque shaft, two distinct and different problems are confronted: The first problem is to provide some means for permitting two different rates of shaft rotation and still maintain a torque connection between the two shafts. The second is to provide means for producing this different rate of rotation without applying a brake to one of the shafts, which in turn would create excessive friction and heat and loss of the input torque used for braking power.

Figure 1:
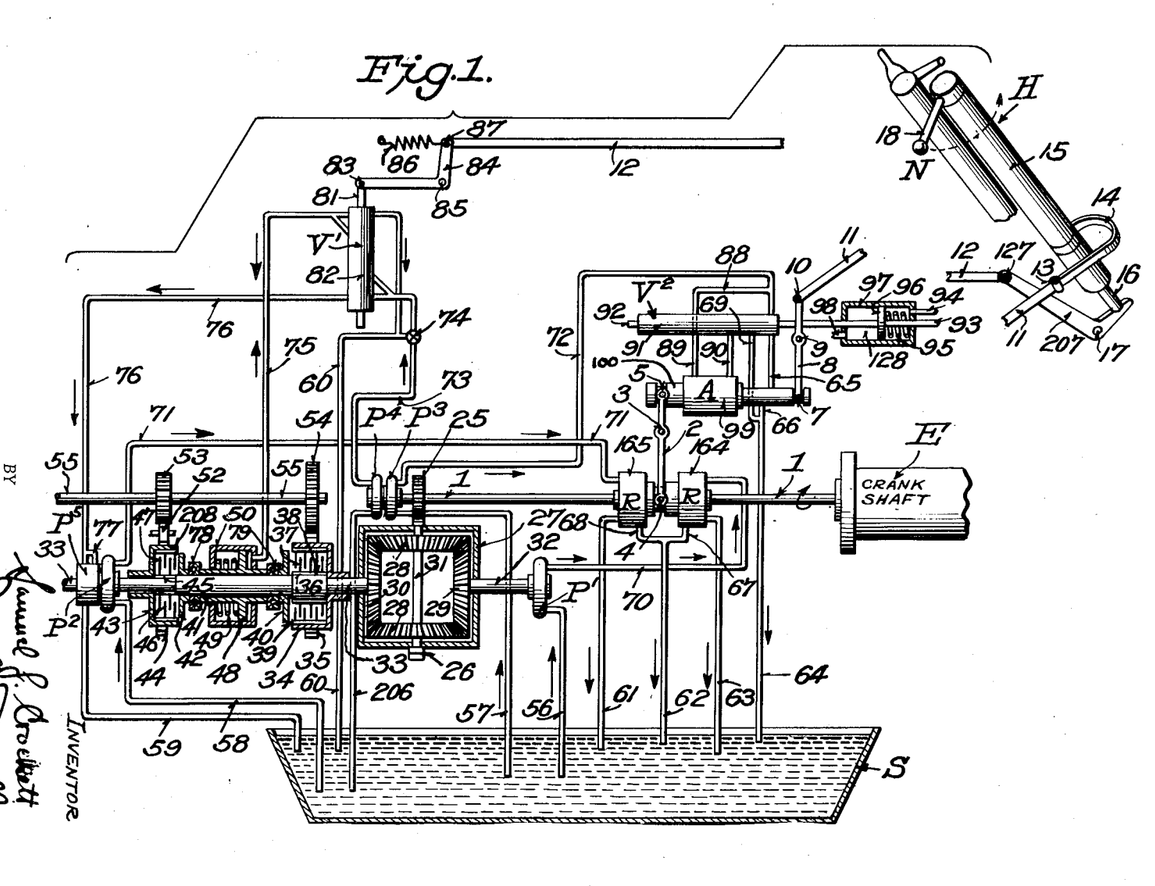
Figure 1 is a diagrammatic view showing the transmission gearing, pumps, shafts, fluid lines and various controls as they would be embodied in a motor vehicle.

The first above-mentioned problems is solved by providing a differential gear-set interposed between the input torque shaft and the output torque shaft to differentiate between the rates of rotation of the two shafts. The problem of controlling one of the shafts without using a friction brake is solved by providing means for relating the amount of rotation positively to any desired proportion to the rate of rotation of the input torque shaft utilizing regulators R as shown in Fig. 1 and in more detail in Figs. 8 and 8a.

According to my invention, torque is impressed on shafts 1 from an internal combustion engine E or the like, causing shaft 1 to rotate in a clockwise direction. As shaft 1 rotates, it causes rotating cylinder blocks 176 and 177 (Figs. 8 and 8a) to rotate also by means of splines 188 and 189. As the blocks rotate the cylinders 172 and 173 which contain free pistons 170 and 171 revolve around the cylinder heads 182 and 183.

Torque from shaft 1 which is transmitted to pumps P1 and P2 respectively by means of pinion 25, gear 26, housing 27, axle 31, bevel gears 28, 29 and 30, and shaft 32 and shaft 33 causes pump P1 to rotate and force oil under pressure through discharge line 70 and likewise pressure is created in line 71 by action of pump P2. Regulators R, shown in the diagram in Fig. 1 and in detail in Figs. 8 and 8a, have cylinder heads 182 and 183 respectively; and these cylinder heads 182 and 183 each have circular grooves or oil collectors 202, 204, 203 and 205. Cylinder head 182 which is connected to pump P1 by means of line 70 contains a high-pressure oil collector groove 202 and a low-pressure oil collector groove 204. Cylinder head 183 is connected to pump P2 by means of line 71 and contains a high-pressure oil collector groove 203 and a low-pressure oil collector groove 205. The pressure groove 202 is connected to the high-pressure or discharge side of pump P1 by means of line 70 and the discharge groove 204 is connected to the sump S by means of discharge line 63.

Pressure oil collector groove 203 is connected to the discharge side of pump P2 by means of line 71 and the discharge groove 205 is connected to sump S by means of discharge line 61.

Figure 7:
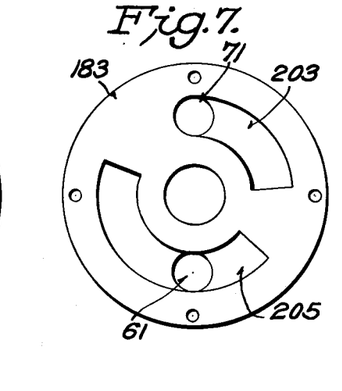
Figs. 7 and 7a are views of the regulator cylinder end plates or heads, showing the input and discharge lines and valving grooves therein.
Figure 7A:
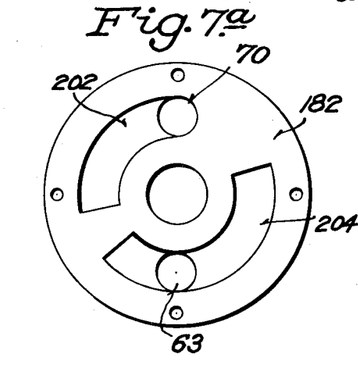

Cylinder heads 182 and 183 are stationary and form a snug fit against the end of cylinder blocks 176 and 177 respectively. The oil collector grooves 202, 204, 203 and 205 are shaped in a circular arrangement about the ends of the cylinder heads 182 and 183 and the center of the oil collector grooves form a radius over the center of cylinders 172 and 173 and pistons 170 and 171. As shown in Fig. 7 and Fig. 7a, the high-pressure grooves 202 and 203 are separated from the discharge grooves 204 and 205. This separation of the two grooves permits a shut-off or valve arrangement between the intake and discharge oil lines 70 and 63 and also 71 and 61.

In operation, torque on shaft 1 causes pump P1 and P2 to operate by means of shaft 1, pinion 25, gear 26, housing 27, bevel gears 28, 29 and 30, axle 31 and shaft 32 and shaft 33. Pump P1 draws oil from sump S through line 56 and discharges it under pressure through line 70 to cylinder head 182 and high-pressure oil collector groove 202. Oil collector groove 202 is longer than the diameter of any of the cylinders 172 and by being in a circular arrangement over cylinders 172, there can be permitted a constant pressure against one or more of pistons 170 at all times when there is pressure in oil pressure line 70. This distribution over one or more cylinders constantly, permits a constant relief for the discharge from pump P1, since cylinder block 176 and cylinders 172 rotate past groove 202. After cylinders 172 pass in their circuit from the pressure oil collector 202 over to the discharge or low pressure groove 204, springs 172 urge piston 170 to the right, Fig. 8a, forcing oil out of cylinders 172 and back into sump S by means of discharge line 63. The operation for pump P2 is the same as above except the use of different pressure and discharge oil lines. If the oil pressure in line 70 is not relieved, pump P1 is blocked for lack of discharge and stopped and likewise shaft 32 is stopped; so by means of using the oil collectors a gradual and smoothly controlled discharge can be permitted and a graduation of the speed of shaft 32 may be obtained. The low-pressure or discharge oil collector 204 is longer than the high-pressure oil collector 202. Since cylinder block 176 may be moving fairly fast, it permits cylinder 172 an extended discharge time so that spring 178 may continue to force piston 170 to the right and force oil out of cylinder 172 even though the cylinder 172 is moving, whereas, it would be almost impossible to clear the oil from cylinder 172 unless the oil collector covered part of the circuit of the cylinder 172 instead of trying to discharge directly into the opening of discharge line 63 as cylinder 172 passes the opening.

The cylinders 172 and 173 in the blocks 176 and 177 communicate with pressure oil collectors 202 and 203 (Figs. 7 and 7a) and if piston regulating heads 166 and 167 are withdrawn from the cylinder head 182 or 183, the oil under pressure fills cylinders 172 or 173 as the case may be, forcing pistons 170 or 171 back against piston regulating fingers 168 or 169 and the cylinders are filled to whatever capacity the fingers 168 or 169 will permit.

Figure 8:
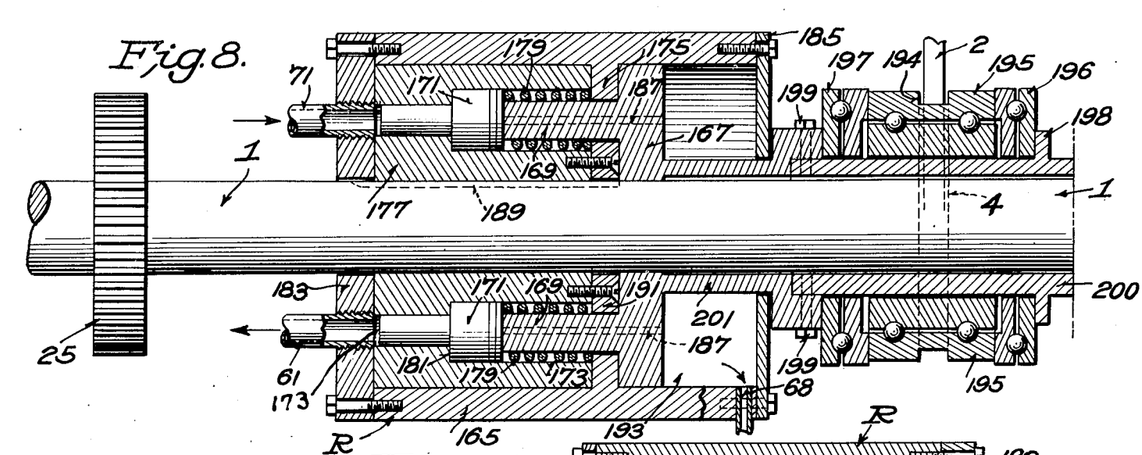
Figs. 8 and 8a are a longitudinal section through one of the regulators R in Fig. 1.
Figure 8A:
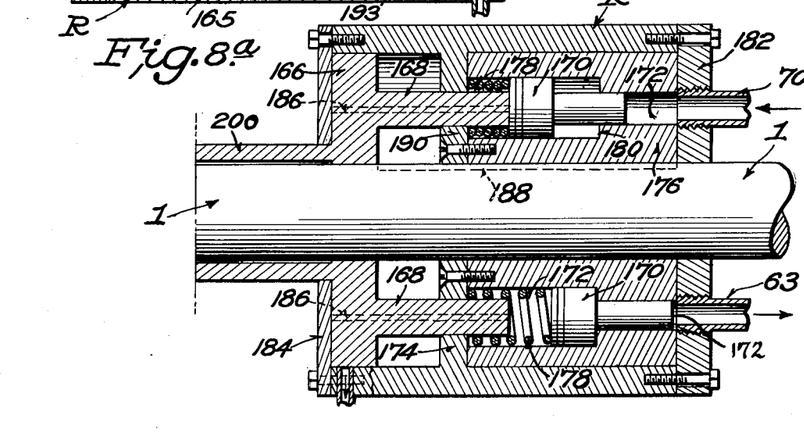

As cylinders 172 and 173 continue their rotation, they leave oil pressure collector rings 202 and 203 and pass over a cut-off between the intake and discharge collectors, and when pistons 170 or 171 come into contact with discharge oil collector rings 204 or 205 (Figs. 7 and 7a), springs 178 or 179 (Figs. 8 and 8a) will force the pistons forward toward the cylinder head 182 or 183 as the case may be, forcing the oil in the respective cylinders (172, 173) to be discharged through lines 63 or 61; and as the rotation cycle of cylinder blocks 176 or 177 continue, an empty cylinder is back to starting position ready to communicate with pressure oil collectors 202 and 203. Therefore, cylinders 172 and 173 act solely as a metering device and not as a valve, and it is the sequence of the cylinders passing the input pressure, picking up a regulated amount of oil and discharging the oil as it continues its cycle, that determines how much oil can be passed through input lines 70 and 71 (Figs. 8 and 8a).

The capacity of cylinders 172 or 173 is regulated by means of actuating sleeve 200 and 201 (Figs. 8 and 8a) moving back or forth along shaft 1, the movement being performed by means of actuating lever 2 and yoke 4 as will be described. Piston regulating heads 166 and 167 move as one unit, and as the capacity in block 176 decreases, the capacity in block 177 increases, or when capacity in block 176 increases, the capacity in block 177 decreases. The cylinders 172 in block 176 act as a regulator to control shaft 32 and the cylinders 173 in block 177 act as a regulator to control shaft 33 (Fig. 1).

As shaft 1 continues to turn and rotate the cylinder blocks 176, 177 of the regulators R, it also rotates pinion 25 (Figs. 1 and 8) and gear pumps P3 and P4. Pinion 25 in turn engages spur gear 26 which is fastened to differential housing 27 causing the housing to rotate. Spider gear axle 31 carrying gears 28 is mounted in housing 27. As housing 27 rotates, it carries axle 31 and bevel gears 28. The bevel gears 28 engage bevel gears 29 and 30 causing either or both of said bevel gears to rotate, depending on whether or not shaft 32 or 33 is being controlled by means of pump P1 or P2.

When the loads on shafts 32 and 33 are the same, both shafts have a tendency to rotate at the same rate. However, if either of said shafts are stopped, the other shaft will rotate twice as fast, assuming that pinion 25 is still rotating at the same rate. Pump P1 is connected with shaft 32 and when shaft 32 rotates, pump P1 picks up oil through suction line 56 (Fig. 1) and discharges it through cylinders 172 in the regulator R, provided the cylinder is not closed by fingers 168. The cylinders 172 have a total capacity that exceeds slightly the total capacity of pump P1 and in computing the capacity of cylinders 172, the ratio of pinion 25 to spur gear 26 must be taken into consideration. For example, assuming pinion 25 turns twice to gear 26 turning one revolution, the cylinders 172 would have to have a capacity slightly larger than the capacity of pump P1, because when shaft 33 is completely stopped, bevel gear 29 and shaft 32 will rotate twice as fast as housing 27 and every time pinion 25 revolves one turn, shaft 32 will also be rotating one turn although gear 26 only rotates one-half of one turn. This is due to the action of spider gears 28 being carried halfway around by axle 31 and being in mesh and rolling around bevel gear 30 which is stopped by action of shaft 33. Therefore, the capacity of the cylinders 172 should be slightly larger than the capacity of pump P1 so as to fully take the entire delivery of pump P1 so that shaft 32 can rotate as freely as possible to permit a neutral state for shaft 33 which is further connected to the output torque shaft 55.

When shaft 33 is completely stopped and shaft 32 is free to turn without being restricted by decreasing the full capacity of cylinders 172 the transmission is in neutral position. As cylinders 172 are gradually closed down in oil dispensing capacity, shaft 32 also proceeds to slow down due to the fact that all the oil being drawn in by the suction stroke of pump P1 can not be discharged as easily because the cylinder capacities have been reduced and have to wait for another cycle of the cylinders to empty more oil from line 70 (Fig. 1). When the cylinders 172 are full of oil and the pump P1 is trying to discharge more oil, the oil will not compress in the lines and cannot go into the cylinders further, therefore the oil acts similarly to a brake, and the pump stroke is halted until another space comes available for discharging the oil. When the pump is halted from discharging, it likewise halts shaft 32 since it is fixed to the shaft. These interruptions are so frequent they transmit a smooth control of shaft 32 similar to the action that connecting rods of an internal combustion engine transmit to the crankshaft.

With the engine continuing to rotate shaft 1 and pinion 25 at the same rate while slowing down shaft 32 by action of regulator R and cylinders 172, shaft 33 will have to increase its rate of rotation proportionately as shaft 32 decreases its rotation. In order for shaft 33 to speed up, pistons 171 in cylinder block 177 have to move back from cylinder head 183 to permit an enlargement of cylinders 173 to accommodate the oil being picked up and discharged by pump P2, since pump P2 is fixed to shaft 33. Both operating ends of regulator R are the same except the direction of the valving in the cylinder heads 182 and 183. The oil ways are in opposite directions. The piston regulating heads 166 and 167 and regulating fingers 168 and 169 are movable as one unit since they are joined by means of bolts 199 on sleeves 200 and 201. So when cylinders 172 are reduced, cylinders 173 are enlarged automatically, permitting pump P2 to discharge fluid in the same proportion that pump P1 is restricted, and permitting shaft 33 to speed up in proportion to the decrease in speed of shaft 32.

Pumps P1 and P2 are of the fixed displacement type, with pistons arranged either axially or radially and having a gravity feed to the suction side to insure an oil pick-up at all times. Pumps P3 and P4 are of the conventional oil-gear type and pumps P3 and P4 may be off-set from shaft 1 by means of a reduction gear if desired to operate at a slower speed than that of input shaft 1.

In neutral position, any torque impressed through shaft 1, pinion 25, gear 26, housing 27, axle 31 and bevel gears 28, is spent through bevel gear 29 and shaft 32 when cylinders 172 permit a full accommodation for pump P1. As shaft 32 is beginning to be slowed down, the torque starts to rotate shaft 33. A forward drive clutch is built around shaft 33, having a housing 34 carrying splines 39 and a spur gear 35. Outside clutch plates 38 are accommodated by spline 39 in housing 34. Spring 49 within cylinder 50 normally exerts pressure against piston 48 and clutch plate shaft 41, thrust bearing 79 and pressure plate 40. Pressure plate 40 compresses clutch plates 37 and 38 together, forming a tight connection between shaft 33 and housing 34 and transmitting the output torque through gear 35 to gear 54 and shaft 55 to drive the wheels of the vehicle in a forward direction.

Shaft 33 also carries another clutch at the opposite end from the forward clutch for use in reverse rotation of shaft 55. Clutch housing 43 is free to revolve about shaft 33 except when the clutch is engaged. Housing 43 carries splines 208 to accommodate clutch plates 46. Shaft 33 carries splines 45 to accomodate clutch plates 47. When it is desired to reverse shaft 55, oil pressure from pump P4 is introduced into cylinder 50 by means of line 73, actuation of valve V1 and line 75. The hydraulic pressure exerted inside of cylinder 50 pushes piston 48 to the left (Fig. 5), compressing spring 49, relieving pressure on clutch plates 37 and 38 and exerting pressure on plates 46 and 47 by means of clutch plate shaft 41, thrust bearing 78 and pressure plate 42. This pressure forms a tight connection between shaft 33 and housing 43 and torque is transmitted to gear 44, idler gear 52 and reverse gear 53, causing a reverse rotation of shaft 55, since housing 34 is free now to rotate about shaft 33. A by-pass or unloading valve 74 is placed in the pressure line 73 to vent pump P4 after sufficient pressure has been exerted in cylinder 50 to keep from damaging the pump while in reversing position.

Figures 2, 3, 9, 10:
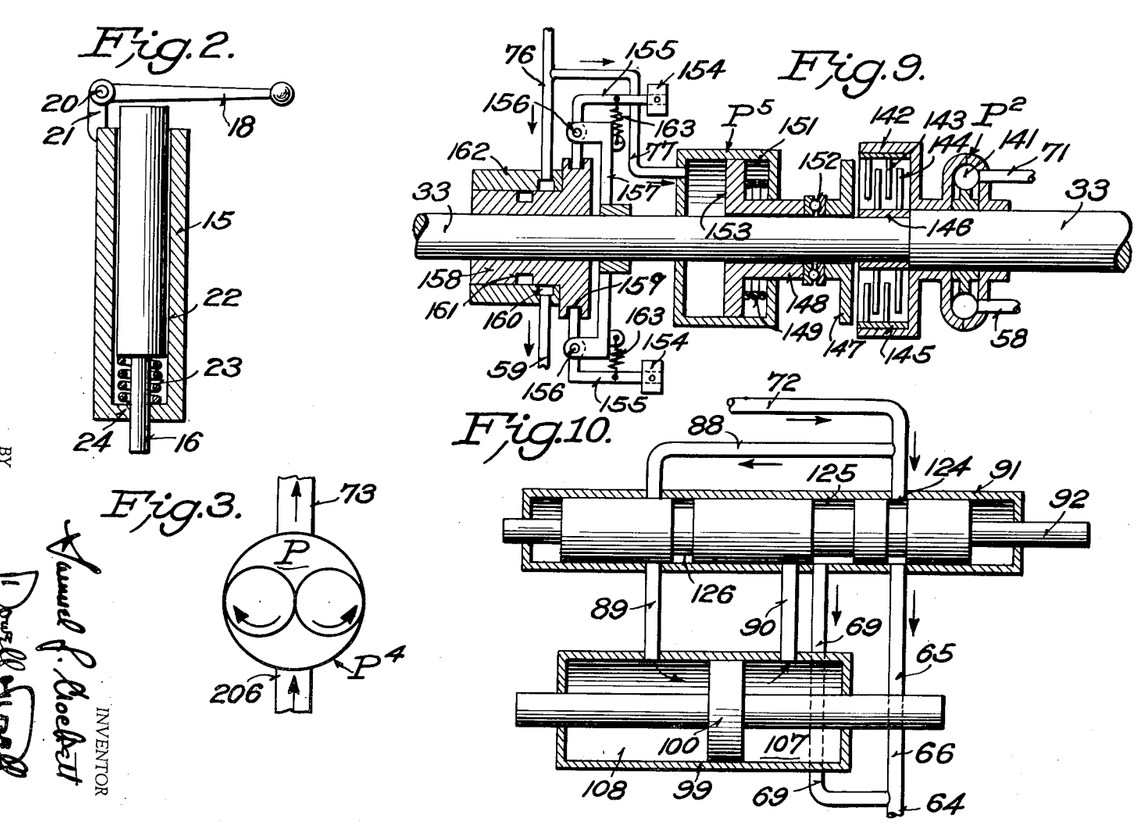
Fig. 2 is a detail section.
Fig. 3 is a diagrammatic view of one of the hydraulic pumps P3 and P4, showing the direction of rotation of the pump gears.
Fig. 9 is a longitudinal section through the regulator valve unit P5 in Fig. 1 for engaging and disengaging pump P2.
Fig. 10 is a longitudinal section through the vacuum operated valve V2 shown in Fig. 1.

In Fig. 1 a valve unit is shown as P5. In Fig. 9 it is shown in detail. Shaft 33 is journaled in stationary journal 162. The housing extends further on the end of shaft 33 than shown in the drawing. It carries an oil collector ring 160 (Fig. 9) inside it, and this ring accommodates pressure line 76 from pump P4 and return line 59. Inside of journal 162 is a sliding valve sleeve 158 having a collector ring 161 for oil, and when sliding valve 158 is moved to proper position, collector ring 161 communicates with oil ring 160 and vents line 76 by means of line 59. At the right end of sliding valve 158 is a bobbin shaped groove to accommodate the ends of weighted arms 155 which carry weights 154. Arms 155 are attached to supports 157 by means of pivots 156. Supports 157 are fixed to shaft 33 and rotate with said shaft. Springs 163 have a tendency to hold weight arms 155 and weights 154 drawn toward shaft 33. When shaft 33 rotates, carrying supports 157, centrifugal force tends to sling weights 154 outwardly. When the weights move outwardly, arms 155 fitted into groove 159 tend to draw sliding valve sleeve 158 to the right (Fig. 9) causing oil rings 161 and 160 to overlap and vent the pressure from line 76.

As shaft 33 slows down, weights 154 draw closer to shaft 33 and sleeve valve 158 moves to the left (Fig. 9) and disengages oil collectors 161 and 160, thereby creating pressure again in line 76. This pressure is transmitted through line 77 to cylinder 151 and forces piston 153 to the right (Fig. 9), compressing spring 149 and exerting pressure against thrust bearing 152 by means of clutch sleeve 148; and pressure plate 147 squeezes plates 143 and 144 to form a solid connection between shaft 33 and housing 142 through splines 145 and 146 in the shaft and housing respectively. This causes housing 142 to rotate with shaft 33. The pumping element 141 within the housing of pump P2 is connected to housing 142 and also rotates, causing pump P2 to draw fluid from line 58 and discharge it through line 71 to regulator R in housing 165 (Fig. 1).

When the vehicle is brought to a stop with the engine E still running, the weight of the vehicle and its contents are holding the shaft 55 by means of the vehicle wheels. This in turn holds shaft 33 and bevel gear 30 while the engine torque is spent through rotation of shaft 32 in idling position. However, in order for shaft 32 to rotate, pump P1 must also operate and in rotating pump P1, a certain amount of engine torque is used up to make pump P1 pick up and discharge oil through regulator R in housing 164. This labor of pump P1 causes a slight backlash of torque. So, in order to prevent the backlash torque from tending to rotate shaft 33 and cause the vehicle to creep, the other pumping unit P2 is attached to shaft 33 and is intended to be only engaged at slow operating speeds of shaft 33 and is brought in and out of operation by means of the clutch 142 and cylinder 151 just described above through action of a governor type valve. After the vehicle once starts moving, there is no need for restraint on shaft 33 by means of pump P2 so it is brought out of service. And when it is not operating, no torque is being used, the pump is not wearing out and heat is not generated in the oil system. A greater portion of the highway driving is done in high gear or top range. When my transmission is in top range, shaft 32 is completely stopped and also pump P1 and there is no wear or generation of heat from pump P1, and the transmission is completely through the gear train and there is no loss, as would be encountered with a fluid coupling between an impeller and runner system as in some types of torque converters.

Referring again to Fig. 9, it will be noted that spring 149 normally urges piston 153 to the left to force fluid back from cylinder 151 through line 77 when line 76 is vented to line 59.

Figure 5:
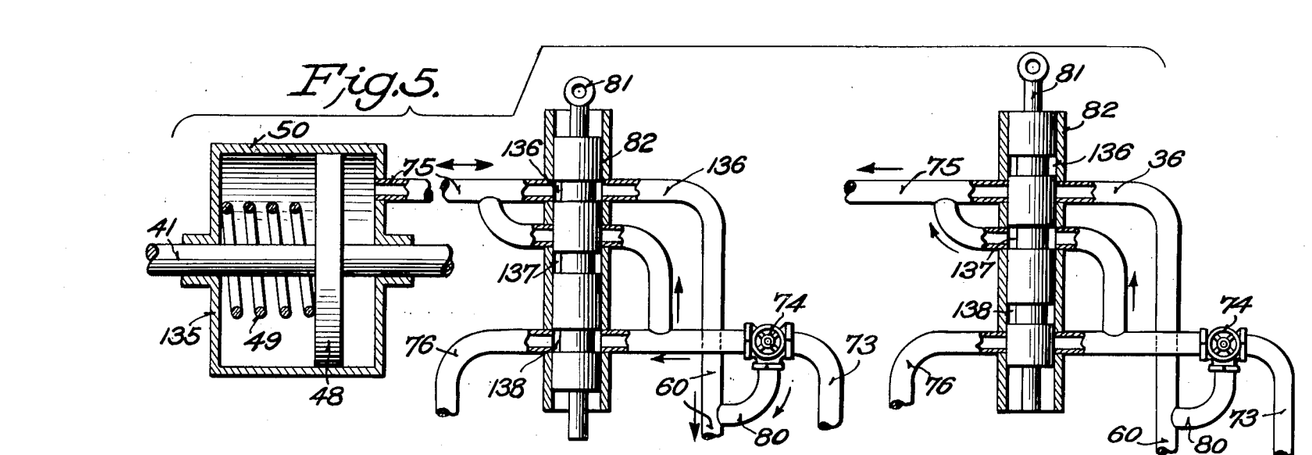
Fig. 5 shows forward and reverse positions of valve V1 shown in Fig. 1, used to change the direction of the output torque shaft from forward to reverse, or vice versa.
Figure 6:
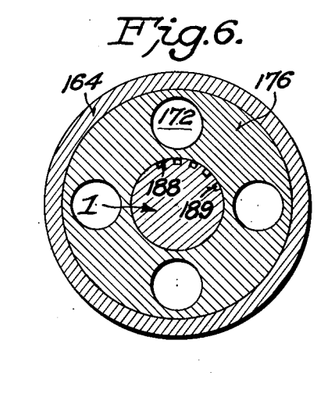
Fig. 6 is a cross section through one of the regulators R in Fig. 1.

Valve V1 (Fig. 1) actuates the forward and reverse rotations of shaft 55. Fig. 5 shows a section of valve V1. The left-hand view shows the valve in forward position, and the right-hand view shows valve position in reverse. In the forward position pressure from line 73 is vented through the valve at port 138 and line 76 to valve unit P5, and returns to sump S by means of line 59. In reverse position, line 73 is blocked from entering line 76, and vent from cylinder 50 is shut off at 136, and pressure is applied to line 75 through port 137 until a maximum pressure is reached within cylinder 50, then by-pass valve 74 opens and vents line 73 through connecting line 80 to return line 60. When the valve is returned to forward position, cylinder 50 is vented at 136 and spring 49 forces piston 48 to the right (Fig. 5) and forces oil out of cylinder 50.

Valve V1 is operated by means of rod 16 (Fig. 1) operating within hollow shaft 15. Rod 16 is maintained by spring 23 (Fig. 2) seated within bore 22 of shaft 15 on shoulder 24 and shaft 16 is forced down by action of lever 18 and presses against bell crank 207. Bell crank 207 is hinged at 17 and pivoted to connecting link 12 by clevis 127. Link 12 is further connected to bell crank 84 by means of clevis 87 and held in position by means of spring 86 attached at 87 and to the housing. Bell crank 84 is pivoted at 85 and connected to valve stem 81 by yoke 83. By pressing down on lever 18 and rod 16, valve V1 is actuated into reverse position by its linkage.

In Fig. 1, the regulator actuating cylinder and piston are shown at A as being connected to the regulator R by means of yoke 5, lever 2, hinged at 3 and yoke 4. The actuating cylinder A is shown in detail in Figs. 4 and 4a.

Figure 4:
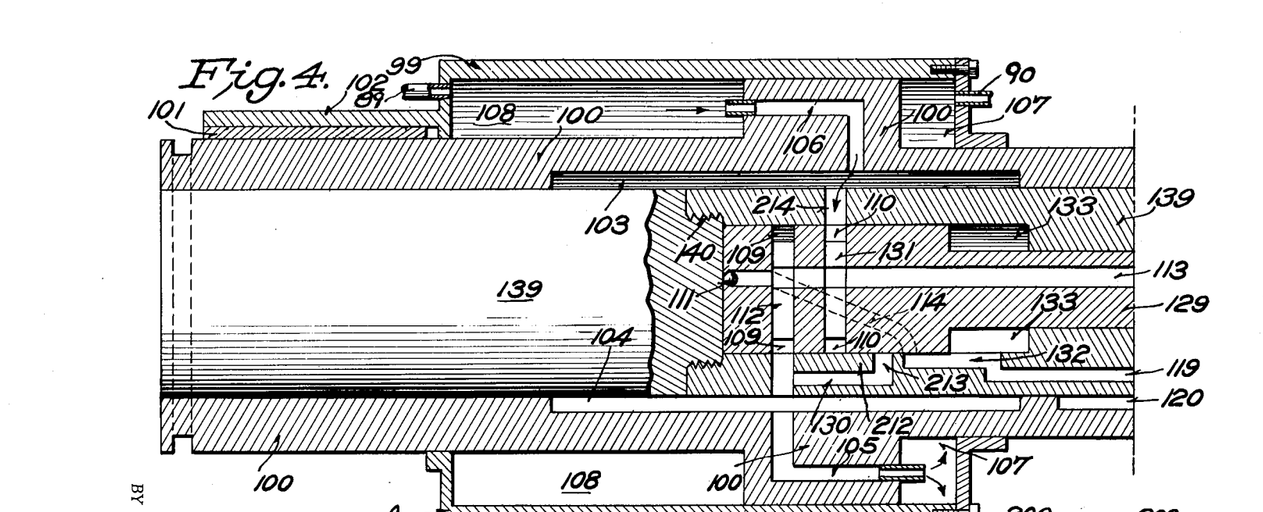
Figs. 4 and 4a show a cross section through the actuating cylinder A in Fig. 1, the purpose of this cylinder and piston being to actuate the regulators R in Fig. 1.

The purpose of the actuating cylinder A is to convert hydraulic pressure into a mechanical force for the purpose of actuating and controlling the amount of capacity within regulators R, which regulators in turn permit regulation of discharge from pumps P1 and P2, as desired. Fig. 4 shows a section through the cylinder within the housing 99. The main piston rod 139 is in two sections and is joined by screw threads at 140. Within the piston rod is a pilot valve rod 129 carrying at its left end the pressure and discharge ports which communicate with ports in piston rod 139 and piston 100. Piston 100 is of a hollow-type and carries extensions in both directions that encase main rod 139. Piston 100 is prevented from rotating by means of lug 101 (Fig. 4) splined into housing extension 102 which is fastened to main housing 99. Rod 139 is movable lengthwise of piston 100 by means of rod 129 engaging it at either end of cylinder 133. Yoke 7 (Fig. 1) prevents rod 129 from rotating out of position. Spline 208 and lug 209 prevent rod 139 from rotating. A ball check valve 111 is inserted in a drilled passageway connecting with vent 114 to prevent compression caused from leakage in the left end of cylinder 133 which would prevent rod 129 from being pushed in if not vented. Rod 129 is actuated by lever 8 (Fig. 1) which is hinged to the housing at pivot 9 and is connected by clevis yoke 10 to connecting link 11 which is further connected to arm 14 by clevis yoke 13. Arm 14 is connected to hollow shaft 15 which is further connected to lever 18 by hinge 20 and mounting post 21. By moving lever 18 in a circular motion, rod 129 can be moved in or out within piston rod 139. At left end of rod 129 (Fig. 4) contact is made with rod 139 and rod 139 can be pushed to any desired position within the limits of movement of piston 100. In this manner the pilot valving 109 and 110 may be positioned as desired and piston 100 will follow up to the proper position.

Fluid flows from the venting line 65 (Fig. 4a) in valve V2 and enters oil passage 117 and allows pressure to go to ports 118, 122 or 123. When piston 100 follows piston rod 139 far enough it will carry the port for discharge line 69 with it to engage port 118 and vent the pressure coming in on line 65 and there will then be no pressure to cause piston 100 to move any further. When piston 100 is moving, fluid comes into cylinder 107 by means of passage 117, 123, 113 and 112 communicating with passage 104 and 105. At the same time, the fluid in the front part of cylinder 108 must be discharged to allow piston 100 to advance. This fluid enters passage 106, 103, 110, 131, 114, 119 and 120 and out line 66. Ports 109 and 110 are positioned by action of lever 18 and 8 to predetermine the position to which the operator wants piston 100 to move, then pressure continues to enter cylinder 107 through oilway 105, because port 109 can communicate with 105 the entire length of oilway 104 while moving up and down.

To move piston 100 to the right (Fig. 4), pilot valve rod 129 is moved to right to the desired position by moving lever 18 toward N (Fig. 1) or neutral position. This moves port 109 to a position behind cut-off block 212, moves discharge port 110 so as to communicate with port 213. Port 109 is moved to communicate with port 214. This change in the pilot valve cuts off the pressure from passage 104 and 105 and cylinder 107. At the same time it pressurizes passages 103, 106 and cylinder 108 and vents cylinder 107 and passages 105 and 104 by means of passages 130, 213, 110, 114, 132, 119, 120 and 66. Then also port 210 has been moved ahead of port 211, thereby cutting off the pressure that had been by-passing through 210 and 211, causing it to follow passage 122, 116, 113, 112, 214, 106 and into cylinder 108.

A shifting type of yoke is connected to piston rod extension 100 at point 5 (Fig. 1). The yoke 5 is further connected to shifting lever 2, and lever 2 is hinged at 3 to the housing and the other end of shifting lever 2 is connected to regulator R in casing 165 by means of shifting yoke 4 in yoke groove 194 (Fig. 8) in outside of bearing race 195. The radial thrust bearing 195 is mounted over actuating sleeve 200 and between two end thrust bearings 196 and 197 (Fig. 8) respectively. Bearing 196 is secure against collar 198 on sleeve 200, and bearing 197 is held in place by lock-nut (not shown) on shaft 200 between end of sleeve 201 and bearing 197.

As piston 100 is moved either left or right, yoke 5 causes lever 2 to be swung on hinge 3, and yoke 4 actuates both ends of regulator R by means of pressure exerted against thrust bearings 196 and 197 causing an increase or decrease in the capacity of cylinders 172 and 173, depending on the direction lever 2 is moved. The reduction of cylinder capacity chokes either pump P1 or pump P2, and the pumps being fastened to the shafts 32 and 33 cause the shaft 32 or 33 to be restrained, which action regulates the speed of shaft 55 in proportion to the speed of shaft 1.

Valve V2 is shown in Fig. 1. This is a vacuum operated valve and is shown in detail in Fig. 10. Also shown in Fig. 1 is a vacuum operated piston and cylinder contained in housing 97.

Vacuum suction line 94 is connected to cylinder 128 on the right side (Fig. 1) of piston 96 and the other end of line 94 is connected to a vacuum pressure generating manifold such as that of an internal combustion engine. Piston 96 is normally urged to the left by means of spring 95. When vacuum is applied through line 94 to the right side of cylinder 128, the air pressure is vented through opening 98 and forces piston 96 to the right end of cylinder 128. When the vacuum pressure falls off in line 94, the tension of spring 95 overcomes the air pressure in the left end of cylinder 128 and forces piston 96 to left and also moves piston rod 93 since it is connected to the piston. Rod 93 is connected to valve stem 92 of the valve shown in Fig. 10 within housing 91. The operating range of the transmission gearing is set by action of piston 100 and regulators R and the regulators are maintained in the pre-set position by action of piston 100; and when the engine is not laboring too hard, a proper vacuum is maintained within the right end of cylinder 128, causing piston 96 to move to the right and move valve stem 92 therewith, causing pressure from pump P3 to by-pass through port 124 and line 65 and be further vented through line 66 and 64. However, when the load is too heavy on the engine, a loss is encountered in the vacuum in line 94 due to the carburetor intake being opened wider to take on more gasoline. This loss in vacuum permits spring 95 to push piston 96 and rod 93 to the left (Fig. 1) which in turn pushes valve stem 92 to the left and begins closing valve 124, cutting off the free discharge in line 72. Pressure is then directed through line 88 and through port 126 and line 89 to cylinder 108 to apply pressure against piston 100. Port 125 connects lines 90 and 69 to vent cylinder 107 through line 69 which is connected to line 66 to form line 64 and return to sump S. This venting of cylinder 107 and pressurizing cylinder 108 causes piston 100 to move right and forces yoke 4 to the left by means of lever 2. This creates a larger cylinder capacity in cylinders 172 (Fig. 8a), permitting pump P1 to discharge more fluid per revolution of shaft 1 and reduces the speed of the output shaft 55, thereby automatically multiplying the torque on shaft 55 to meet the demand of the engine that is laboring under a heavy load. As the load on the engine lightens, vacuum pressure again builds up in line 94 and draws piston 96 back by means of air pressure entering vent 98, which action automatically puts the regulator R back to the preset position as selected by the setting of rod 129, because the operation of piston 100 has no effect on the setting of the pilot valve, since the venting of cylinder 107 and pressurizing cylinder 108 was accomplished through action of the valve V2 by means of the vacuum piston 96.

My invention provides a variable ratio transmission using the principle of the differential gear set unit, having an output shaft, and a controlled shaft, and a means for controlling the controlled shaft without the use of clutches or frictions; also a sequencing device that has a variable capacity and the capacity can be regulated or graduated to any desired amount from zero to its full capacity, said sequencing device used to relate the rotation of a controlled shaft in any fixed proportion to the rotation of an input or output torque shaft by means of metering out regulated amounts of fluid per revolution; also an automatically self-adjusting two-way hydraulic piston, adjustable to any predetermined position by means of a pilot control valve.

IN OPERATION

In operation of the transmission, the same basic road problems are encountered as with any conventional motor vehicle. These problems are standing still with engine idling; moving the vehicle forward; slowing down the vehicle; stopping; and reversing.

Standing still, engine idling

With the engine E idling, and the vehicle standing still, lever 18 (Fig. 1) will be in neutral position shown at N in said figure. With lever 18 at N position, actuator piston A (Fig. 1) and shown as 100 in Fig. 4, will be moved to the right-hand side (Figs. 4 and 4a) or to such position as to make cylinder 107 its smallest capacity, and cylinder 108 its largest capacity. This is accomplished by linkage 15, 14, 13, 11, 10, 9 and 8.

With piston 100 moved to right, regulator R is moved to the left by means of arm 2 acting on pivot 3. Hydraulic force from piston 100 moves lever 2 which in turn moves yoke 4 and by means of actuating sleeve 200, piston regulating heads 166 and 167 are moved to the left, as shown in Figs. 8 and 8a. This in turn increases the volume of cylinders 172 and decreases the volume of cylinders 173. With cylinders 173 closed off, pistons 171 are extended to the cylinder head 183 leaving no fluid capacity, and pump unit P2 has no discharge outlet and the fluid in line 71 merely jams against the pumping elements of pump P2, locking the unit P2 against rotation. The pumping unit P2 is motivated from the shaft 33 by means of clutch plates 143 and 144 (Fig. 9) and it thereby restrains shaft 33 from rotating as long as pressure is contained within cylinder 151. With shaft 33 restrained from rotating, shaft 55, which is the output torque shaft to the vehicle wheels, is also restrained from rotating by means of gears 54 and 35 and clutch plates 37 and 38, since the clutch plates are normally engaged in forward operating position while the engine E is idling.

With regulating head 166 moved to the left (Fig. 8a), pistons 170 are enabled to move to the left under pressure through line 70, and cylinders 172 are enlarged to their fullest capacity and are able to accommodate all the fluid discharged from pump P1 without restriction or back pressure, permitting shaft 32 to rotate freely with pump P1.

The two above described operations restrict rotation of shaft 33 while permitting rotation of shaft 32. Torque is applied by the engine crank shaft to input power shaft 1 and thus rotates regulators R, pinion 25, gear 26, and housing 27, which carries axle 31 and bevel gears 28. Bevel gear 30 is fixed to shaft 33 and is restrained from rotating, while bevel gears 28 rotate around bevel gear 30 causing bevel gear 29 to rotate and to rotate shaft 32 and pump P1. At the same time pumps P3 and P4 are rotating and pumping oil. The torque from shaft 1 is thus spent in rotating pump P1 which picks up oil through line 56 from sump S and delivers it through line 70 and to the right-hand regulator R and returns it to sump S through line 63. Fluid is drawn up by pump P3 through line 57 and discharged through line 72 valve port 124 (Fig. 10) and line 65, and pump by-pass port 118 (Fig. 4a) and return line 66 to sump S through line 64.

Pump P4 draws fluid from sump S through suction line 206 and discharges it through line 73, by-pass valve 74 and through valve port 138 (Fig. 5) and through line 76 to valve unit P5. With the vehicle in a standing or neutral position, weights 154 are drawn toward shaft 33 by springs 163, and sliding valve 158 is moved to the left to disengage oil rings 160 and 161, thereby blocking discharge of oil from line 76 to line 59. Pressure thus builds up in line 76 from pump P4, and by means of line 77 (Fig. 9) the pressure is transmitted to cylinder 151 and reacts against piston 153 causing clutch plates 143 and 144 to be engaged by action of pressure plate 147 and sleeve 148. This action makes a solid connection between shaft 33 and pump unit P2.

Moving forward

To move the vehicle out of neutral and to operate it in a forward direction, lever 18 must be moved into position H (Fig. 1) or high range. Moving lever 18 toward H moves piston 100 of actuator A to the left and by means of lever 2 working on hinge pin 3, regulator R is moved to the right, increasing the volume of cylinders 173 (Fig. 8) and decreasing the volume of cylinders 172 (Fig. 8a). Increasing the volume of cylinders 173 provides space for the discharge of oil out of line 71 and relieves the retarding force against element 141 of pump unit P2 permitting it to rotate, and also allows shaft 33 to rotate which in turn permits shaft 55 to rotate by means of intermeshing gears 54 and 35 and clutch plates 37 and 38.

At the same rate that the volume of cylinders 173 is being increased, the volume of cylinders 172 (Fig. 8a) is being decreased, through the same action of lever 18 and lever 2. Decreasing the volume of cylinders 172 produces a retarding force in line 70 because the pump P1 is a fixed displacement pump and continues to deliver the same quantity of fluid per revolution, whereas the volume of cylinders 172 is decreased and will not accommodate as much fluid per revolution as it did in neutral position. With the torque being delivered at the same rate, the off-setting revolutions are delivered through shaft 33 because shaft 32 is being retarded by the decreasing capacity of the cylinders 172, which in turn retards pump P1 proportionately, and the further toward position H that arm 18 is moved, the more pump P1 is retarded, until rotation of shaft 32 and pump P1 is completely stopped, which position is at high or top range. While in forward operation, pumps P3 and P4 continue to pump as before described with respect to neutral position, except that as the vehicle moves forward, rings 160 and 161 (Fig. 9) intercommunicate, permitting fluid from pump P4 to be discharged through line 59 without exerting pressure within line 77 and cylinder 151. By-pass 74 only opens after a predetermined pressure in line 76 has been reached in neutral or reverse. Pump P3 operates as before described for neutral idling position, except as will be described later for fast acceleration and loss of vacuum.

Slowing down

To slow down or stop the vehicle, the lever 18 is moved from position H toward position N (Fig. 1) and the operation of actuator valve A and regulators R are a reverse operation of the above described starting or forward moving motion.

Hard pulling or fast acceleration

Vacuum operated piston 96 (Fig. 1) is attached to valve V2 and piston rod 92. Valve V2 (Fig. 10) gives an automatic down-shift toward low range automatically when the engine encounters hard pulling and loses its vacuum pressure. Vacuum suction line 94 is connected to cylinder 128 on the side of piston 96 nearest spring 95. When the engine is not laboring too hard the vacuum pressure overcomes the force of spring 95 and pulls rod 92 to the right (Fig. 1). This permits fluid to flow through line 72 (Fig. 10) and pass through port 124 to line 65 and to actuator A, and to move piston 100 to the predetermined position as set by the pilot valves at the end of valve rod 129 (Figs. 4 and 4a) or to be vented through the actuator freely and out of line 66 provided piston 100 is in its predetermined position.

If the engine begins to labor or the accelerator is pressed hard, the engine will lose its vacuum pressure. Then spring 95 (Fig. 1) will overcome the vacuum pressure and push piston 96 and rod 92 to the left (Fig. 1). This action causes ports 124, 125 and 126 to move to the left (Fig. 10). Port 124 closes the free discharge from line 72 to line 65 and diverts the pressure through line 88 and through port 126 to line 89 and applies pressure within cylinder 108 (Figs. 10 and 4). Pressure will force piston 100 to the right (Fig. 10) and force fluid out of cylinder 107 through line 90, port 125 and back through line 69, same discharging through line 64 which is joined to and forms part of line 66. As piston 100 moves to the right, it shifts lever 2 (Fig. 1) and regulator R. The right-hand movement of piston 100 causes piston regulating head 166 to move to the left, increasing the volume of cylinders 172, which in turn permits pump P1 to discharge more fluid per revolution of cylinders 172 and thereby permits shaft 32 to rotate more turns. By permitting shaft 32 to rotate more revolutions, shaft 33 is permitted to slow down by means of the bevel gears 29 and 30 and bevel gears 28, which act as a differential gear-set. By permitting shaft 32 to rotate more times per engine revolution and to decrease the rotation of shaft 33 multiplies the torque being delivered on output shaft 55 and permits the engine to speed up and build back its vacuum pressure. All this above operation is being done automatically by the rise and fall in the vacuum pressure since piston 100 is free to move within its limits within cylinders 107 and 108 and slide along piston rod 139 and within cylinder housing 99, being governed only by the hydraulic pressure being exerted on either side of the piston itself.

During this operation back or forth due to rise or fall in vacuum pressure, the lever 18 remains in its set position as left by the vehicle operator, and valve V2 acts as a venting valve to pressure one side of piston 100 and vent the other side so it will move. When the vacuum pressure returns strong enough to overcome spring 95, the valve V2 is moved right by means of rod 92 being attached to the piston 96 and air pressure enters vent 98 to force the piston to the right. This action blocks pressure from entering line 89 and vents it through port 124 to line 65 where the pressure again enters passage 117 and moves the piston 100 back to the predetermined setting of the pilot valve 129, which is only moved by means of lever 18.

Reversing

To operate the vhicle in reverse direction, lever 18 is moved to N or neutral position. Lever 18 is pressed down against rod 16, Fig. 2. Reverse rod 16 engages end of bell crank 207 which is connected to connecting link 12 and bell crank 84. Bell crank 84 is connected to valve stem 81 of valve V1 (Fig. 1).

In Fig. 5, valve V1 is shown in forward operating position at the left and at the right it is shown in reversing position. Referring to the left-hand drawing, pressure from pump P4 is delivered through line 73 to by-pass valve 74 and through port 138 to line 76, while the input pressure line 75 is blocked by position of valve port 137, and the cylinder 50 is vented through port 136 to return line 60.

Referring to the right-hand drawing of valve V1 (Fig. 5), showing the valve in reversing position, line 76 is blocked by position of port 138, and the pressure from line 73 is directed through port 137 to pressure line 75 and from thence to cylinder 50, forcing piston 48 to the left (Fig. 5) moving clutch plate shaft 41 to the left and applying pressure against thrust bearing 78 and reverse clutch plate 42, and thus pressing clutch plates 46 and 47 together forming a connection between shaft 33 and reverse clutch housing 43 to apply torque through gear 44, idler gear 52 and reverse gear 53 which is fixed to shaft 55.

When piston 48 moves to the left, pressure plate 40 also moves to the left and relieves the pressure on clutch plates 37 and 38, thereby disconnecting the forward-drive clutch housing 34 from shaft 33, permitting housing 34 to rotate freely about shaft 33 during reverse driving. While in reverse drive, line 76 is blocked and cylinder 50 becomes filled to capacity. However, pump P4 continues to rotate with the engine shaft 1. By-pass valve 74 is placed in the pressure line 73 and when the pressure rises to the desired point, valve 74 opens and lets pump P4 discharge through line 80 (Fig. 5) and return to sump S by means of line 60. After lever 18 has been pressed down against rod 16 to reverse valve V1, the lever latches in a groove in a quadrant (not shown) so as to hold lever 18 in reversing position. Then, lever is moved again toward H position as in operating the vehicle in a forward direction. The same operation of the pumps, gears, and shafts operate the vehicle in reverse as in forward direction and the vehicle will have the same range in reverse as in forward position by moving lever 18 to desired range.

Figure 4A:
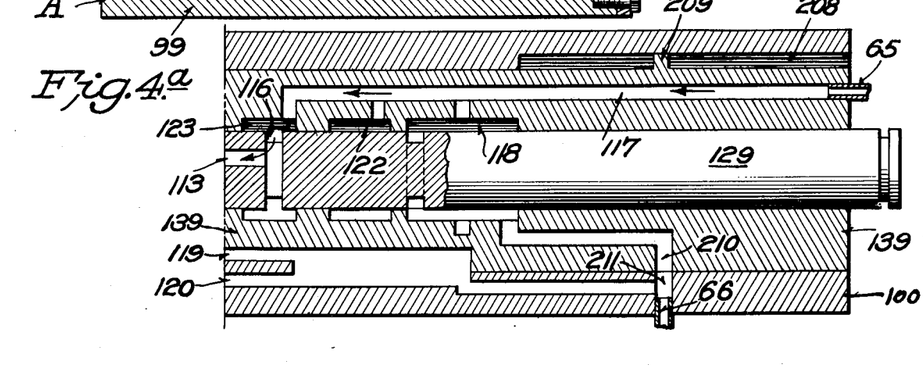

Figs. 4 and 4a show detailed drawings of the actuator A in Fig. 1. This actuator is the control means for the transmission, being actuated by hydraulic force to a predetermined position which position is selected by actuating the lever 18. The regulators R shown in Fig. 1 have to be moved back and forth to vary the range of the gearing, and the actuator A does this work hydraulically, and holds the regulators R in position until it is desired to move them again or until they are moved by action of the vacuum operated valve V2. The cylinder housing 99 contains three moving parts: piston 100, piston rod 139, which is in two pieces, and the pilot valve rod assembly 129. The pilot valve assembly 129 is connected by linkage to lever 18, and is movable back or forth by actuating lever 18. The piston rod 139, which carries ports drilled and machined in its body can be moved forward or backward by moving the pilot valve 129 to either end of cylinder 133. The piston 100 is only moved by hydraulic pressure being exerted on either side of it within cylinder 107 or 108 with the corresponding cylinder being vented to a discharge line 66 by action of piston 100 aligning passage 211 and 210, or by action of valve V2 venting cylinder 107 through port 125 and line 69 (Fig. 10).

Assuming that the transmission has been placed into high range with lever 18 at position H (Fig. 1), then pilot valve 129 would be pushed to the extreme left, engaging piston rod 139 at the left end of cylinder 133 near threads 140 and would push piston rod 139 to the extreme left. Piston 100 would be forced to move to left also because the by-passing fluid pressure (entering line 65 (Fig. 4a), 117, port 118 and passing on out unrestricted through 210 and line 66) would be shut off at 210, causing pressure to build up in line 65 which would be diverted through 116, 113, 112, 109, 104, 105 into cylinder 107 to force piston 100 to move to the left. Piston 100 would maintain this position while the lever 18 is in position H.

With piston 100 in the left-hand position as above described, assume that a load is encountered by the engine and the vacuum pressure falls, rod 92 (Fig. 10) will be moved to the left by action of vacuum piston 96 (Fig. 1) shutting off pressure to line 65 (Fig. 10) by closing port 124. Ports 126 and 125 will move to the left to engage lines 88 and 89; also 90 and 69 respectively. The pressure in line 72 which has been passing freely through 65 is now shut off by shifting of port 124, causing pump P3 to build up pressure within line 72, 88, 89 and cylinder 108, forcing piston 100 to the right and forcing fluid out of cylinder 107 through lines 90 and 69 by means of port 125. When the engine overcomes its load and the vacuum pressure is rebuilt, port 124 again engages line 72 and 65 venting the pressure from line 72 and directing it again to line 65 (Fig. 4a). Piston 100 is now out of the original setting by lever 18 although lever 18 has not been moved.

The movement to the right of piston 100 caused by the venting action of valve V2 has moved port 211 (Fig. 4a) to the right of port 210, cutting off the free discharge of fluid coming in through port 65, causing it to again build up pressure from pump P3. The pressurized fluid will now return through ports 117, 113, 112, 109, 104, 105 and enter cylinder 107 and cause piston 100 to move back to the predetermined setting of lever 18, and at the same time fluid within cylinder 108 will automatically vent through passages 106, 103, 214, 110, 114, 119 and 120 and out line 66 as described previously. Thus it can be seen that piston 100 is free to move automatically back and forth as required by the pilot valving and the vacuum pressure and load demand of the engine.

I do not limit my invention to the exact form shown in the drawing, for obviously changes may be made therein within the scope of the claims.

I claim:

1. In a power transmission of infinitely variable ratio, an input shaft; an output shaft; a differential housing rotated by the input shaft and carrying a pair of spider gears and a pair of bevel gears meshing with said spider gears respectively; a differential shaft keyed to one bevel gear; a pump actuated by said differential shaft; a second differential shaft keyed to the other bevel gear; a second pump clutchable to said second differential shaft; a pair of spaced clutch housings freely journaled on the second differential shaft; gear trains connecting the clutch housings respectively with said output shaft for rotating the output shaft in opposite directions; clutch elements fixedly mounted on the second differential shaft within said housings respectively; pressure means for normally engaging the clutch elements with one of said housings while maintaining the clutch elements of said other housing disengaged; a third pump and a fourth pump driven by the input shaft; a valve unit driven by the second differential shaft; a sump containing fluid; a pair of regulators actuated by the input shaft and comprising spaced rotatable cylinder blocks and fixed casings having inlets and outlets respectively, said blocks having pistons therein rotating with the blocks; said first pump directing fluid from the sump into the inlet of one of said regulators and discharging fluid from the outlet of said regulator into the sump; the second pump directing fluid from the sump into the inlet of the other regulator and discharging same from the outlet of the other regulator into said sump; said regulators serving as metering devices to determine the amount of fluid passing therethrough; actuator means for increasing the capacities of the cylinders of one block while simultaneously decreasing the capacities of the cylinders of the other block to control the relative rotations of the first and second differential shafts respectively; the cylinders in the related regulator block having a total capacity exceeding that of the first pump, whereby when the actuator means is operated to increase the volume of the regulator cylinders related to the first pump to their maximum amount the second pump will have no fluid discharge and the second differential shaft will be locked against rotation while the first differential shaft is freely rotating the first pump; said fourth pump drawing fluid from the sump and discharging same into the valve unit; the third pump drawing fluid from the sump and discharging same through an automatic valve back to the sump; governor means actuated by the second differential shaft disposed in the discharge duct of the valve unit for closing said duct whereby the fluid pressure therein will operate a clutch means for locking the second pump to said second differential shaft; said actuator means simultaneously and oppositely varying the capacities of the pair of regulators to vary the speed of rotation of the second differential shaft from zero to maximum; and means for manually controlling the setting of the actuator means.

2. In a power transmission as set forth in claim 1, said regulators having a common slidable shaft which when shifted in one direction will increase the volume of the cylinders of the block associated with the second differential shaft while simultaneously decreasing the volume of the cylinders of the other block; said first named cylinders passing fluid through the second pump and rotating the second differential shaft therewith according to the ratio of capacities of the cylinders of the respective regulators; said rotation of the second differential shaft retarding rotation of the first differential shaft proportionately until high speed of the second differential shaft is attained, the rotation of the second differential shaft actuating the governor and unblocking the passage of fluid to the valve unit, thereby unlocking the second pump from the second differential shaft.

3. In a power transmission as set forth in claim 1, said actuator means comprising a double-acting cylinder, a piston rod therein, a pilot valve rod within said piston; and a pivoted lever connecting the piston rod with said respective pistons of the regulator valves for simultaneously shifting the latter pistons; said manual means setting the pilot valve rods.

4. In a power transmission of infinitely variable ratio, an input shaft; an output shaft; a differential housing rotated by the input shaft and carrying a pair of spider gears and carrying a pair of bevel gears meshing with said spider gears respectively; a differential shaft keyed to one bevel gear; a pump actuated by said differential shaft; a second differential shaft keyed to the other bevel gear; a second pump clutchable to said second differential shaft; a pair of spaced clutch housings freely journaled on the second differential shaft; intermeshing gear trains connecting the clutch housings respectively with said output shaft for rotating the output shaft in opposite directions; clutch elements fixedly mounted on the second differential shaft within said housings respectively; pressure means for normally engaging the clutch elements with one of said housings while maintaining the clutch elements of said other housing disengaged; a third pump and a fourth pump driven by the input shaft; a valve unit driven by the second differential shaft; a sump containing fluid; a pair of regulators actuated by the input shaft and comprising spaced rotatable cylinder blocks and fixed casings having inlets and outlets respectively, said blocks having pistons therein rotating with the blocks; said first pump directing fluid from the sump into the inlet of one of said regulators and discharging fluid from the outlet of said regulator into the sump; the second pump directing fluid from the sump into the inlet of the other regulator and discharging same from the outlet of the said other regulator into said sump; said regulators serving as metering devices to determine the amount of fluid passing therethrough; actuator means for increasing the capacities of the cylinders of one block while simultaneously decreasing the capacities of the cylinders of the other block to control the relative rotations of the first and second differential shafts respectively; the cylinders in the related regulator block having a total capacity exceeding that of the first pump, whereby when the actuator means is operated to increase the volume of the regulator cylinders related to the first pump to their maximum amount the second pump will have no fluid discharge and the second differential shaft will be locked against rotation while the first differential shaft is freely rotating the first pump; said fourth pump drawing fluid from the sump and discharging same to a valve unit; the third pump drawing fluid from the sump and discharging same through an automatic valve back to the sump; governor means actuated by the second differential shaft disposed in the discharge duct of the valve unit for closing said duct whereby the fluid pressure therein will operate a clutch means for locking the second pump to said second differential shaft; said actuator means simultaneously and oppositely varying the capacities of the pair of regulators to vary the speed of rotation of the second differential shaft from zero to maximum; means for manually controlling the setting of the actuator means; and means for automatically controlling the setting of the actuator means to maintain constant speed ratio of the two differential shafts under heavy loads or fast acceleration.

5. In a power transmission as set forth in claim 4, said regulator having a common slidable shaft which when shifted in one direction will increase the volume of the cylinders of the block associated with the second differential shaft while simultaneously decreasing the volume of the cylinders of the other block; said first named cylinders passing fluid through the second pump and rotating the second differential shaft therewith according to the ratio of capacities of the cylinders of the respective regulators, said rotation of the second differential shaft retarding rotation of the first differential shaft proportionately until high speed of the second differential shaft is attained, the rotation of the second differential shaft actuating the governor and unblocking the passage of fluid to the valve unit, thereby unlocking the second pump from the second differential shaft.

6. In a power transmission as set forth in claim 4, said actuator means comprising a double-acting cylinder, a piston rod therein, a pilot valve rod within said piston; a pivoted lever connecting the piston rod with said respective pistons of the regulator valves for simultaneously shifting the latter pistons; said manual means setting the pilot valve rod; and said automatic means comprising a cylinder receiving the discharge of the third pump; a piston valve in said latter cylinder, and ducts in the automatic means controlling the fluid directed to each end of the actuator cylinder; spring operated means normally maintaining the piston valve of the automatic means in one position; vacuum operated means for shifting the piston valve when the vacuum pressure of the prime mover of the input shaft falls to proportionately divert the pressure from the third pump into one end of the actuator cylinder to shift the actuator piston into position to thereby increase the volume of fluid passing through the regulator cylinder related to the second differential shaft.

7. In a power transmission of infinitely variable ratio, an input shaft; an output shaft; a differential housing rotated by the input shaft and carrying a pair of spider gears and carrying a pair of bevel gears meshing with said spider gears respectively; a differential shaft keyed to one bevel gear; a pump actuated by said differential shaft; a second differential shaft keyed to the other bevel gear; a second pump clutchable to said second differential shaft; a pair of spaced clutch housings freely journaled on the second differential shaft; intermeshing gear trains connecting the clutch housings respectively with said output shaft for rotating the output shaft in opposite directions; clutch elements fixedly mounted on the second differential shaft within said housings respectively; pressure means for normally engaging the clutch elements with one of said housings while maintaining the clutch elements of said other housing disengaged; a third pump and a fourth pump driven by the input shaft; a valve unit driven by the second differential shaft; a sump containing fluid; a pair of regulators actuated by the input shaft and comprising spaced rotatable cylinder blocks and fixed casings having inlet and outlets respectively, said blocks having pistons therein rotating with the blocks; said first pump directing fluid from the sump into the inlet of one of said regulators and discharging fluid from the outlet of said regulator into the sump; the second pump directing fluid from the sump into the inlet of the other regulator and discharging same from the outlet of the other regulator into said sump; said regulators serving as metering devices to determine the amount of fluid passing therethrough; actuator means for increasing the capacities of the cylinders of one block while simultaneously decreasing the capacities of the cylinders of the other block to control the relative rotations of the first and second differential shafts respectively; the cylinders in the related regulator block having a total capacity exceeding that of the first pump, whereby when the actuator means is operated to increase the volume of the regulator cylinders related to the first pump to their maximum amount the second pump will have no fluid discharge and the second differential shaft will be locked against rotation while the first differential shaft is freely rotating the first pump; said fourth pump drawing fluid from the sump and discharging same to the valve unit; the third pump drawing fluid from the sump and discharging same through an automatic valve back to the sump; governor means actuated by the second differential shaft disposed in the discharge duct of the valve unit for closing said duct whereby the fluid pressure therein will operate a clutch means for locking the second pump to said second differential shaft; said actuator means simultaneously and oppositely varying the capacities of the pair of regulators to vary the speed of rotation of the second differential shaft from zero to maximum; means for manually controlling the setting of the actuator means; means for automatically controlling the setting of the actuator means to maintain constant speed ratio of the two differential shafts under heavy loads or fast acceleration; and means for reversing the direction of rotation of the second differential shaft.

8. In a power transmission as set forth in claim 7, said regulator having a common slidable shaft which when shifted in one direction will increase the volume of the cylinders of the block associated with the second differential shaft while simultaneously decreasing the volume of the cylinders of the other block; said first named cylinders passing fluid through the second pump and rotating the second differential shaft therewith according to the ratio of capacities of the cylinders of the respective regulators, said rotation of the second differential shaft retarding rotation of the first differential shaft proportionately until high speed of the second differential shaft is attained, the rotation of the second differential shaft actuating the governor and unblocking the passage of fluid to the valve unit thereby unlocking the second pump from the second differential shaft.

9. In a power transmission as set forth in claim 7, said actuator means comprising a double-acting cylinder, a piston rod therein, a pilot valve rod within said piston; a pivoted lever connecting the piston rod with said respective pistons of the regulator valves for simultaneously shifting the latter pistons; said manual means setting the pilot valve rod; and said automatic means comprising a cylinder receiving the discharge of the third pump; a piston valve in said latter cylinder, and ducts in the automatic means controlling the fluid directed to each end of the actuator cylinder; spring operated means normally maintaining the piston valve of the automatic means in one position; vacuum operated means for shifting the piston valve when the vacuum pressure of the prime mover of the input shaft falls to proportionately divert the pressure from the third pump into one end of the actuator cylinder to shift the actuator piston into position to thereby increase the volume of fluid passing through the regulator cylinder related to the second differential shaft.

10. In a power transmission as set forth in claim 7, said reversing means comprising a cylinder, a valve stem; manual means for operating said valve stem, said valve stem normally connecting the fluid pressure from the fourth pump to a by-pass valve and a line leading to the valve unit and to the sump; and manual means for shifting said valve stem whereby the line leading to the valve unit will be blocked and the pressure from the fourth pump will be directed to the pressure means.

References Cited in the file of this patent

UNITED STATES PATENTS

| | | |
|---|---|---|
| 995,915 | Schmidt | June 20, 1911 |
| 1,747,497 | Weylandt | Feb. 18, 1930 |
| 1,800,062 | Fordyce | Apr. 7, 1931 |
| 2,059,591 | Leoni | Nov. 3, 1936 |
| 2,064,295 | Crane | Dec. 15, 1936 |
| 2,117,852 | Pealmain | May 17, 1938 |
| 2,187,737 | Gregory | Jan. 23, 1940 |
| 2,278,351 | Havens et al. | Mar. 31, 1942 |
| 2,296,929 | Ifield | Sept. 29, 1942 |
| 2,517,188 | Feng | Aug. 1, 1950 |
| 2,580,449 | Maat | Jan. 1, 1952 |
| 2,596,231 | Frost | May 13, 1952 |

FOREIGN PATENTS

| | | |
|---|---|---|
| 585,734 | France | Dec. 15, 1924 |
| 623,674 | France | Mar. 22, 1927 |